(12) United States Patent
Radecki

(10) Patent No.: US 7,327,350 B1
(45) Date of Patent: Feb. 5, 2008

(54) INPUT DEVICE FOR CONTROL OF COMPUTER SOFTWARE DESIGNED TO ASSIST PERSONS OF REDUCED VISUAL ACUITY

(75) Inventor: Ryan Patrick Radecki, 1805 Aschinger Blvd., Columbus, OH (US) 43212

(73) Assignee: Ryan Patrick Radecki, Portland, OR (US)

( * ) Notice: Subject to any disclaimer, the term of this patent is extended or adjusted under 35 U.S.C. 154(b) by 2 days.

(21) Appl. No.: 11/486,865

(22) Filed: Jul. 17, 2006

(51) Int. Cl.
*G09G 5/00* (2006.01)

(52) U.S. Cl. .................... 345/156; 345/169; 345/660; 345/472; 715/702; 715/800; 715/815; 200/5 R; 200/6 A; 200/11 R; 200/521

(58) Field of Classification Search ........ 345/156–169, 345/660, 472, 472.1, 472.2; 341/22, 34; 463/33, 38; 200/5 A, 5 R, 6 A, 17 R, 11 R, 200/521, 526, 326; 715/702, 788, 798, 800, 715/815
See application file for complete search history.

(56) References Cited

U.S. PATENT DOCUMENTS

| | | | | |
|---|---|---|---|---|
| 4,551,717 A | * | 11/1985 | Dreher ...................... | 345/170 |
| 5,627,531 A | * | 5/1997 | Posso et al. .................. | 341/22 |
| 6,593,914 B1 | * | 7/2003 | Nuovo et al. ............... | 345/169 |
| 6,636,197 B1 | * | 10/2003 | Goldenberg et al. ........ | 345/156 |
| 6,717,571 B2 | * | 4/2004 | Chen ........................... | 345/157 |
| 6,762,372 B2 | * | 7/2004 | Nishimoto et al. ............ | 200/4 |
| 6,924,823 B2 | * | 8/2005 | Maruyama et al. ......... | 345/660 |
| 7,173,603 B2 | * | 2/2007 | Kawasome ................. | 345/156 |
| 2002/0149566 A1 | * | 10/2002 | Sarkissian .................... | 345/168 |
| 2003/0095096 A1 | * | 5/2003 | Robbin et al. .............. | 345/156 |
| 2005/0168435 A1 | * | 8/2005 | Reed et al. ................. | 345/156 |

* cited by examiner

*Primary Examiner*—Lun-Yi Lao

(57) ABSTRACT

An input device designed to allow persons of reduced visual acuity to manipulate computer software providing magnification is disclosed. The device attaches to a personal computer via standard peripheral attachment, e.g., Universal Serial Bus. A single, large, lighted button on the superior surface of the device allows the activation and deactivation of computer software providing magnification. A bezel beneath the button may be rotated to control the level of magnification applied by the computer software providing magnification.

1 Claim, 1 Drawing Sheet

Side Elevation Cross-Section View

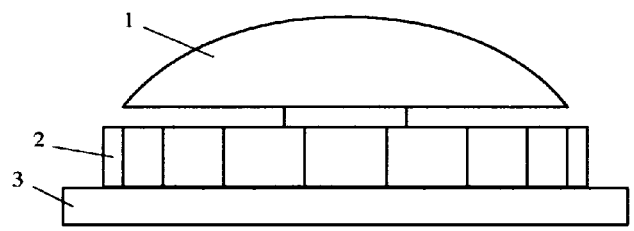
Figure 1a - Side Elevation View
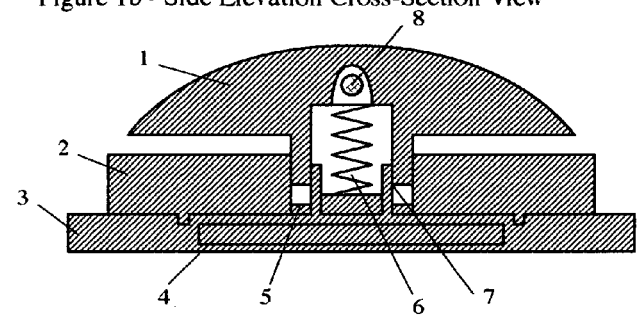
Figure 1b - Side Elevation Cross-Section View
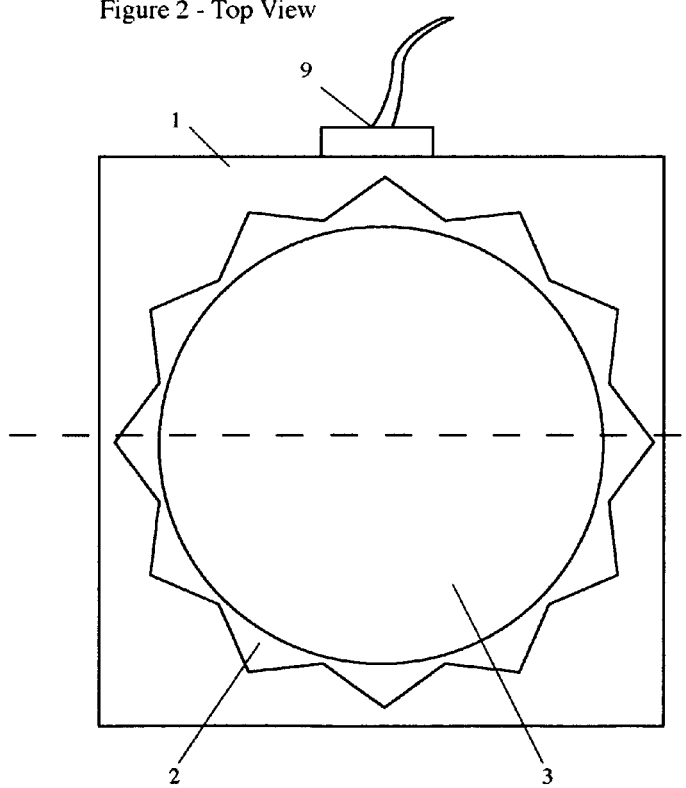
Figure 2 - Top View
Fig. 1b Section Line

INPUT DEVICE FOR CONTROL OF COMPUTER SOFTWARE DESIGNED TO ASSIST PERSONS OF REDUCED VISUAL ACUITY

CROSS-REFERENCE TO RELATED APPLICATIONS

None.

STATEMENT REGARDING FEDERALLY SPONSORED RESEARCH OR DEVELOPMENT

No federal sponsorship is applicable to this invention.

BRIEF DESCRIPTION OF THE INVENTION

This invention relates to computer input devices. Specifically, this invention relates to computer input devices for the control of software assisting persons of low visual acuity.

BACKGROUND OF THE INVENTION

A regrettable consequence of the human aging process is the gradual loss of photoreceptors in the retina of the eye. Also, a number of pathologic processes affect the structures of the eye and degrade their ability to transmit or detect light. These processes reduce the useful vision of affected persons, and cannot be corrected by or enhanced with typical refracting lenses found in spectacles.

Contemporary solutions involve the enlargement of content for affected persons. This involves magnifying lenses that attach to spectacles, handheld magnifying instruments, and projection screens that enlarge content. Additionally, for personal computers, a small number of software products will increase the size of on-screen content. Continuing efforts are being made to enhance the functioning of persons of low visual acuity, particularly with respect to the increasing presence of personal computing in daily life.

SUMMARY OF THE INVENTION

The invention relates to increasing the accessibility of personal computers to persons of low-visual acuity. Specifically, this invention relates to an input device designed to increase the ease-of-use of computer software that magnifies on-screen information.

There are a small number of products and mechanisms for the magnification of content displayed on-screen for personal computer. These products consist both of projection screens, and computer software that enlarges content on the computer monitor. However, these software products frequently require persons of normal vision to configure and adjust them. This invention is designed for the increasing cohort of persons requiring magnification of their computer screen, and a simple mechanism with which to do so.

Additionally, these products require a certain amount of familiarly with computers. The typical persons afflicted by reduction in visual acuity would be better served by devices and interfaces that are simply designed, and do not require normal visual acuity to activate and deactivate, or make adjustments to the magnification. This device is lit for ease in location, and has a limited set of simple controls. The controls are designed to be ideal for persons who may also possess comorbidities of aging, such as arthritis. Visual, tactile, and audible feedback are also incorporated into the device.

BRIEF DESCRIPTION OF THE DRAWINGS

The invention will be readily understood by the following detailed description in conjunction with the accompanying drawings, wherein reference numerals designate like structural elements, and in which:

FIGS. 1A and 1B show the device from a side elevation view, with 1B showing a cross-sectional view.

FIG. 2 shows the device from a top view.

DETAILED DESCRIPTION OF THE INVENTION

Embodiments of the invention are discussed below with reference to FIGS. 1-2. However, those skilled in the art will readily appreciate that the detailed description given herein with respect to these figures is for explanatory purposes as the invention extends beyond these limited embodiments.

FIG. 1A is a side elevation showing the exterior device. The obvious components on this view are the large, superiorly located button 1, the rotating bezel 2, and the sturdy, weighted base 3. The button 1 is constructed of hard, translucent plastic, and comfortably fills the palm of an average size hand. The bezel 2 is immediately below it, and does not obstruct a short range of downward motion by the button.

FIG. 1B is a side elevation showing a cross-section of the device. The button 1 can be seen protruding through the center of the bezel 2 and its position maintained by a guiding structure 7. A spring assembly 6 provides recoil to return the button to its upward position following its depression. A sensor 5 detects the depression of the button via completion of a circuit. The electronic circuit board 4 coordinates signals from rotation of the bezel and depression of the button with the personal computer (not pictured). The outputs include the depression of the button 1, which would activate and deactivate the magnifying software on the personal computer, and the detection of rotation of the bezel, which would modify the degree of magnification provided by the magnifying software on the personal computer. The light-emitting diode 8 for illumination of the translucent button is seen in the center of the button. The diode 8 is illuminated to 25% of maximum brightness when the device is connected to a computer and the magnification is deactivated, and the diode 8 is illuminated to 100% of maximum brightness when the device is connected to a computer and the magnification is activated.

FIG. 2 is a top view clearly showing the bezel 2 and the indentations for grasping the bezel. The bezel 2 rotated clockwise and counterclockwise, providing tactile and audible feedback as it clicks into interval positions as it rotates. Also shown on this figure is the connection site 9 where an appropriate modality for connection to a personal computer is located. At present time, the most appropriate method of connection is Universal Serial Bus (USB).

The simplicity of this device, along with its tactile, visual, and audible feedback, are its strengths. Its use allows a person of low visual acuity to activate and manipulate the degree of magnification of on-screen content easily, regardless of familiarity with computer software. This device's large, easily manipulated controls are ideal for persons who may not be comfortable, or capable of, manipulating smaller, or more complicated, objects.

It should be noted that there are many alternative ways of implementing the methods and apparatuses of the present invention. It is therefore intended that the appended claims

What is claimed as the content of this invention is the following:

1. An input device attached to a personal computer via standard peripheral attachment, e.g., Universal Serial Bus (USB), for the control of software on the personal computer that magnifies the content displayed on a monitor connected to the personal computer, the input device essentially comprising:

a weighted base, made of heavy plastic or rubberized metal, that rests securely on a surface nearby the personal computer;

a circular bezel of approximately one-and-a-half centimeters in height, made of solid plastic, resting in the center of the weighted base, corrugated for increased ability to grasp and turn with fingers, which has the ability to rotate clockwise and counterclockwise, in which rotation in the clockwise direction signals the software on the personal computer to increase the magnification of on-screen content, and rotation in the counter-clockwise direction signals the software on the personal computer to reduce the magnification of on-screen content, and wherein the rotation of the bezel provides tactile and audible feedback at discrete intervals of rotation;

a dome-shaped circular button, made of translucent plastic, centered over the circular bezel, sized to fit comfortably in the human palm, which, upon depression, sends a signal to the software on the personal computer to activate or deactivate the magnification ability, as appropriate;

a spring assembly, which provides recoil to the dome-shaped circular button;

a light-emitting diode (LED), inside the dome-shaped circular button, that is illuminated when the device is connected to a personal computer, and is illuminated at 25% maximum brightness when the magnification software on the personal computer is inactive, and is illuminated to 100% maximum brightness when the magnification software on the personal computer is active.

* * * * *